United States Patent [19]

Winzer et al.

[11] 4,351,585

[45] * Sep. 28, 1982

[54] COUPLING ELEMENT FOR AN OPTICAL WAVEGUIDE

[75] Inventors: Gerhard Winzer; Franz Auracher, both of Munich, Fed. Rep. of Germany

[73] Assignee: Siemens Aktiengesellschaft, Berlin & Munich, Fed. Rep. of Germany

[*] Notice: The portion of the term of this patent subsequent to Apr. 20, 1999, has been disclaimed.

[21] Appl. No.: 91,898

[22] Filed: Nov. 7, 1979

[30] Foreign Application Priority Data

Nov. 29, 1978 [DE] Fed. Rep. of Germany ....... 2851646

[51] Int. Cl.³ ............................................. G02B 5/172
[52] U.S. Cl. ................... 350/96.15; 250/227
[58] Field of Search ............... 350/96.15, 96.16, 96.20, 350/96.21, 320, 96.30, 96.29; 250/227

[56] References Cited

U.S. PATENT DOCUMENTS

| | | | |
|---|---|---|---|
| 3,308,394 | 3/1967 | Snitzer et al. | 350/96.29 X |
| 3,619,030 | 11/1971 | Tomii et al. | 350/96.15 X |
| 3,870,396 | 3/1975 | Racki et al. | 350/96.16 |
| 3,977,764 | 8/1976 | d'Auria et al. | 350/96.16 |
| 4,173,390 | 11/1979 | Käch | 350/96.16 |
| 4,176,908 | 12/1979 | Wagner | 350/96,15 |

FOREIGN PATENT DOCUMENTS

| | | | |
|---|---|---|---|
| 2625892 | 12/1977 | Fed. Rep. of Germany | 350/96.30 |
| 52-64939 | 5/1977 | Japan | 350/96.15 |

OTHER PUBLICATIONS

Bloem et al., "Fiber-Optic Coupler", *IBM Tech. Discl. Bull.*, vol. 16, No. 1, Jun. 1973, pp. 146-147.
"Simple Coupler Taps Fiber-Optic Cables", *Electronics*, Dec. 20, 1973, pp. 30-31.
Kuwahara et al., "A Semi-Transparent Mirror-Type Directional Coupler . . .", *IEEE Trans. on M'Wave Th. & Tech.*, Jan. 1975, pp. 179-180.

*Primary Examiner*—John D. Lee
*Attorney, Agent, or Firm*—Hill, Van Santen, Steadman, Chiara & Simpson

[57] ABSTRACT

An improved coupling element for coupling light into and out of a light component, which coupling element consists of a single core of cladded glass fiber whose cladding has a diameter that amounts to at least 1 mm so that the cladding acts as a member for supporting the core in the coupling element. Preferably, at least one flat surface is formed on the cladding to facilitate attaching the branching waveguide or fiber.

3 Claims, 3 Drawing Figures

4,351,585

COUPLING ELEMENT FOR AN OPTICAL WAVEGUIDE

BACKGROUND OF THE INVENTION

The present invention is directed to a coupling element for use either to couple out a light signal from an optical waveguide or for coupling a light signal into an optical waveguide, wherein at least one of the waveguides is mounted in a carrying member.

The coupling elements, which may be used to couple light into or out of a waveguide are known. For example, an earlier U.S. patent application, Ser. No. 066,695, which included the disclosure of German patent application P 28 40 602.2, and U.S. patent application, Ser. No. 068,051, now U.S. Pat. No. 4,285,571, which included the disclosure of German patent application P 28 42 535.6 described a coupling element by which a light component or signal is coupled out of a waveguide by means of a beam divider reflector or mirror. In the first of the two applications, the coupled out light component or signal is directly conveyed to a detector and in the second mentioned application the coupled out light component is coupled into a branching off optical waveguide. In another U.S. copending patent application, Ser. No. 066,694, which includes the disclosure of German application P 28 40 493.5, a frequency-selective optical light distributor element was proposed in which a light component of a specific wave length is coupled out of a waveguide with the aid of a dichroic reflector. In all of these applications, the embodiments are described in which the optical waveguides which as a rule consist of a multimode-glass fiber, are mounted in supporting member which consist of glass capillaries. The supporting member with the waveguide mounted therein is fabricated so that the waveguide is introduced into the opening of the capillary and is secured therein by means of an optical cement. The coupling element, which is proposed in the above mentioned applications, can be advantageously manufactured in both a simple and self adjusting fashion.

SUMMARY OF THE INVENTION

It is the object of the present invention to provide a coupling element of the type which can be manufactured even more simply than the coupling elements of the above mentioned copending applications.

To accomplish these tasks the invention is directed to an improvement in a coupling element for use in coupling a light signal into or out of an optical waveguide, said element comprising at least one waveguide being mounted in a support member. The improvement comprises a support member together with a waveguide mounted therein being formed by a single core optical fiber having a cladding with a diameter of at least 1 mm so that the cladding is very thick relative to the diameter of the core.

Through this surprisingly simple proposed solution, the manufacture of the optical waveguide and the manufacture of the support member with the waveguide mounted therein are condensed into a single method step, namely the drawing of a glass fiber with a thick cladding. The manufacture of such a fiber involves no technical difficulties. The fiber can be drawn in a problem free manner with a conventional double crucible method with a correspondingly great drawing nozzle in the exterior crucible or can be drawn from a conventional rod method which uses correspondingly shaped preforms. The proposed coupling element is not restricted to a coupling element proposed in the above mentioned copending applications. Every coupling element, which possesses optical waveguides mounted in a carrier, can on principle be transformed into the proposed coupling element through utilization of the glass fiber with a thick cladding. The core cladded glass fiber with a thick cladding possesses sufficient stability for grinding and polishing operations and need not be additionally embedded or mounted in a capillary. A particular advantage of the proposed coupling element is that the element is advantageously suited for coupling out a light component or signal from a monomode fiber with the aid of a beam divider reflector.

The invention enables solving a frequently occurring problem which problem occurs while tapping a small light component or signal from a continuous monomode fiber in order, for example, to measure the signal level in the fiber and then make adjustments to keep the signal level constant by using a control loop. Heretofore, a coupling element, which couples out or in with the aid of a beam divider, was used for this purpose because the output and/or input coupling efficiency is relatively poor in the case of a monomode fiber.

A proposed coupling element which is suitable for a monomode fiber is advantageously so designed that the monomode fiber is divided into two separate parts by a partially reflective layer extending obliquely to the core of the fiber with the core end surfaces in flush contact therewith. A multimode waveguide is mounted on a surface of the cladded optical fiber with the end face of the multimode waveguides being positioned to receive light reflected from one of the parts of the monomode fiber by the reflective layer so that the reflective light is coupled into the multimode waveguide. Preferably, the multimode waveguide may extend to a light sensitive detector whose signal is coupled to a control circuit for a laser diode.

The coupling element possesses a good output coupling efficiency whereby the efficiency is greater because of the greater core diameter and acceptance angle of the multimode fiber. The element is outstandingly suited for the above indicated regulating purpose whereby it is again advantageous that the branched off light signal is in most instances only guided over a relative short distance to the detector.

In many instances, particularly in the last cited coupling element for monomode fibers, it is expedient if the cladding is relatively thick in relation to the core and exhibits two plane parallel surfaces which run along the length of the fiber.

DESCRIPTION OF THE PREFERRED EMBODIMENTS

Figure 1:
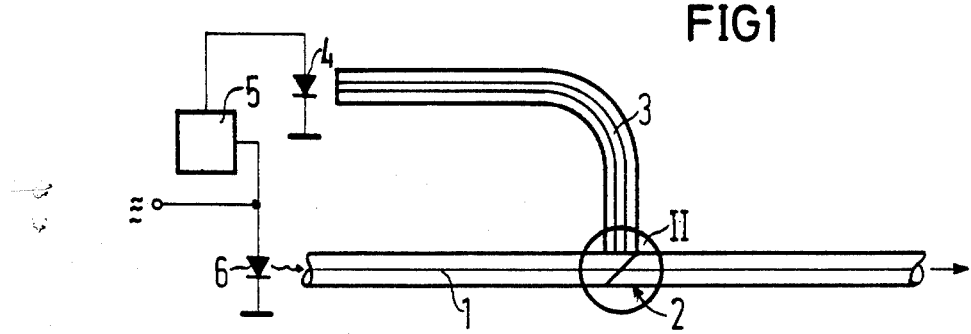
FIG. 1 is a schematic representation of a coupling element in accordance with the present invention utilized with a control loop for measuring the signal level in a waveguide.

The principles of the present invention are particularly useful in a coupling element generally indicated at 2 in FIG. 1. As it is illustrated, the coupling element is part of a waveguide 1 such as a monomode fiber. At the coupling element 2, a portion of the light in the waveguide 1 is reflected or coupled out and into a multimode fiber 3, whose end is in flush contact with the fiber 1 at the position of the coupling element 2. The multimode fiber 3 extends to a light sensitive detector 4, which is coupled to a control circuit 5 and supplies an actual value of the power of the light in the fiber or waveguide 1. The control circuit 5 controls the current for a laser diode 6, whose light is coupled into the monomode fiber forming the waveguide 1 so that the power level in the waveguide 1 will remain constant in spite of aging of the laser diode.

Figure 2:
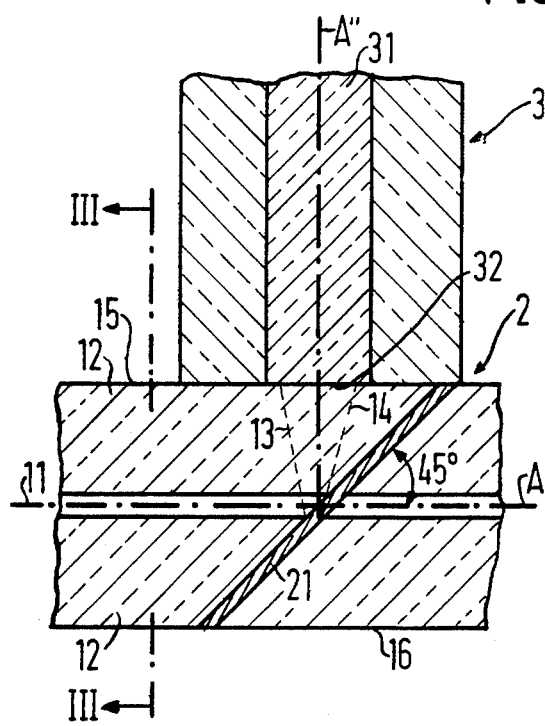
FIG. 2 is an enlarged cross sectional view of the coupling element enclosed in circle II of FIG. 1.
Figure 3:
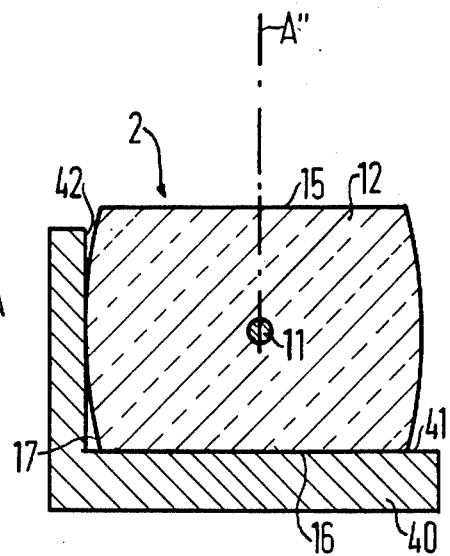
FIG. 3 is a cross sectional view taken along the lines III—III of FIG. 2.

As best illustrated in FIG. 2, the coupling element 2 is formed by the monomode fiber 1, which is a single core cladded glass fiber which has a core 11 surrounded by a cladding 12. The cladding 12 has a diameter which amounts to at least 1 mm so that the cladding is very thick relative to the diameter of the core 11. Since the diameter of the core lies in a micrometer range, and the diameter of the cladding is in the millimeter range, a true-to-scale illustration is not possible.

In the monomode fiber 1 of the coupling element 2, a layer type beam divider reflector 21 is arranged to reflect the portion of light conveyed in the core 11 and deflect it out of the fiber. The orientation of the beam dividing layer is expediently selected so that the surface normal of the layer 21 extends at an angle and lies in a plane formed by the intersecting axis A of the core 11 and a perpendicular axis A". It should also be noted that the normal of the surface 2 bisects the angle formed by the axis A and A". The two parts of the fiber 1, which is separated by the beam divider or reflector layer 21 are in flush contact with the layer 21.

The beam divider reflector 21 causes a component of the light guided in the core 11 of the monomode fiber 1 to be reflected in a lateral outward direction. In FIG. 2, it is assumed that the light in the core propogates from left to right so that the reflected part in the case of orientation of the beam divider reflecting layer 21 therein propogates in an upward direction. The reflected light component will propogate within a cone which is indicated in FIG. 2 by the broken boundary lines 13 and 14.

As a second separate feature of the device at the location where the light which is reflected by the beam divider reflector 21 and therefore the light that would be coupled out emerges from the cladding 12 of the monomode fiber 1, a multimode fiber 3, which has a core 31 and an end surface 32, is placed with the end surface 32 engaging the surface of the cladding 12 in a flush fashion. Expediently, the cladding 12 of the fiber 1 has for this purpose a planar surface 15, which can be easily produced by the planar grinding when the fiber has a thickness of the cladding in accordance with the present invention.

As it can be readily seen in FIG. 2, it is desireable that the axis of the multimode fiber 3 coincides with the axis A" of the cone of the light reflected by the layer 21 so that the axis A of the core 11 and the axis of the fiber 3 intersect in the plane of layer 21.

Expediently, the multimode fiber 3 also consists of a fiber with a cladding of at least one millimeter diameter which is a very thick cladding in comparison with the core. However, the multimode fiber 3 can also be a conventional core cladded glass fiber which is held on the monomode fiber 1 by means of a retaining device or member.

The manufacture of a core cladded glass fiber with a very thick cladding in comparison to the diameter of the core can be readily obtained by conventional manufacturing methods. For example by using a double crucible method or the rod method. In the case of the double crucible method, only the ratio between the drawing nozzles of the exterior crucible relative to the interior crucible must be selected to be sufficiently great. In the case of the rod method, the ratio of the diameter of the exterior of the workpiece to the core diameter must be selected to be sufficiently great.

The monomode fiber 1 with the beam divider reflector or reflective layer 21 can be manufactured in a self adjusting manner. For this purpose, a monomode fiber is separated into two parts by means of a cut along a plane extending obliquely relative to the axis A. This is readily possible because the fiber due to the thick cladding exhibits a sufficient stability. The cut is then made at an angle preferably 45° relative to the axis A. The cut faces of each of the two parts are then polished to bring them to the desired optical quality. On one of the two polished cut faces, a layer of the beam divider element is applied for example by means of vapor depositing a metal layer thereon. The two fiber parts are then brought together and secured such as by cementing. The process can be preformed advantageously by means of a self adjusting method in which the two fiber parts are placed on a support member 40 having a support surface 41 being engaged by a flat surface 16 of the cladding 12 of the two parts and a lateral stop or guide 42 which engages another surface such as 17. By moving the two parts relative together, such as by shifting one of the two parts the end faces or surfaces can be brought together with the core 11 of each part being axially aligned.

The plane parallel surfaces 15 and 16 and the reflective layer forming the beam divider element 21 are expediently so oriented that their surface normal lies in a plane which is defined by the two axes A and A". In the case of self adjusting manufacture of the monomode fiber with the beam divider reflective layer, one of the two plane parallel surfaces such as 16 lies on a planar surface 41 of the support member 40 and the remaining curve surface such as 17 rests against the stop surface 42. Subsequent to joining the two parts together, the waveguide 3 is secured on one of the flat surfaces such as 15 with the core 31 being in a position to receive the reflected light which travels in a cone defined by the lines 13 and 14.

It should be noted that a multimode fiber with a beam divider reflective layer can be manufactured in the same manner as the above mentioned monomode fiber. In this manner, all coupling elements can be manufactured which utilize a beam divider reflective layer or a frequency selective beam divider filter.

Although various minor modifications may be suggested by those versed in the art, it should be understood that we wish to embody within the scope of the patent granted hereon all such modifications as reasonably and properly come within the scope of our contribution to the art.

We claim:

1. In a coupling element for use in coupling a light signal into or out of an optical waveguide, said element comprising at least one waveguide being mounted in a support member, the improvement comprising the support member together with the waveguide mounted therein being formed by a single glass core optical fiber having a glass cladding with a diameter of at least 1 mm so that the cladding is very thick relative to the diameter of the core, said single glass core optical fiber with a glass cladding being a monomode glass fiber divided into two separate parts by a partially reflective layer extending obliquely to the core of the fiber with the core end surfaces being in flush contact therewith, and a multimode waveguide being mounted on a surface of the cladding of the optical fiber with an end surface positioned to receive light reflected from one of the parts of the monomode fiber by the reflective layer, so that the reflected light is coupled into the multimode waveguide.

2. In a coupling element according to claim 1, wherein the cladding of the optical fiber has a flat surface, and said multimode waveguide being a fiber having an end surface secured on said flat surface at said position for receiving light reflected by the reflective layer.

3. In a coupling element according to claim 1, wherein the multimode waveguide extends to a light sensitive detector.

* * * * *